(12) United States Patent
Jaeger et al.

(10) Patent No.: US 10,198,245 B1
(45) Date of Patent: Feb. 5, 2019

(54) DETERMINING HIERARCHICAL USER INTERFACE CONTROLS DURING CONTENT PLAYBACK

(71) Applicant: AUDIBLE, INC., Newark, NJ (US)

(72) Inventors: Timothy Jaeger, Metuchen, NJ (US); Alison Mae Go, Brooklyn, NY (US)

(73) Assignee: Audible, Inc., Newark, NJ (US)

( * ) Notice: Subject to any disclaimer, the term of this patent is extended or adjusted under 35 U.S.C. 154(b) by 673 days.

(21) Appl. No.: 14/274,380

(22) Filed: May 9, 2014

(51) Int. Cl.
*G06F 3/048* (2013.01)
*G06F 3/16* (2006.01)

(52) U.S. Cl.
CPC .................................. *G06F 3/167* (2013.01)

(58) Field of Classification Search
None
See application file for complete search history.

(56) References Cited

U.S. PATENT DOCUMENTS

| | | | | |
|---|---|---|---|---|
| 5,136,505 A * | 8/1992 | Inamori | ............. | G06F 17/2827 704/4 |
| 5,517,407 A * | 5/1996 | Weiner | .................. | G06F 1/1632 704/1 |
| 6,434,518 B1 * | 8/2002 | Glenn | .................. | G06F 17/289 434/156 |
| 6,901,255 B2 * | 5/2005 | Shostak | ................ | H04M 1/725 455/422.1 |
| 7,912,723 B2 * | 3/2011 | Qu | ........................ | G09B 19/04 704/270 |
| 2003/0156140 A1 * | 8/2003 | Watanabe | ............. | G06F 3/0482 715/810 |
| 2003/0163459 A1 * | 8/2003 | Shem-Ur | .......... | G06F 17/30893 |
| 2005/0182675 A1 * | 8/2005 | Huettner | ............ | G06Q 30/0258 705/14.56 |
| 2007/0050184 A1 * | 3/2007 | Drucker | .................. | G10L 13/00 704/3 |
| 2007/0198353 A1 * | 8/2007 | Behringer | .............. | G06Q 30/02 705/14.55 |
| 2008/0301739 A1 * | 12/2008 | Goldeen | ............ | H04N 7/17318 725/88 |
| 2009/0132921 A1 * | 5/2009 | Hwangbo | ............. | G06F 3/0482 715/716 |
| 2010/0064005 A1 * | 3/2010 | Amaya | .................. | G06Q 30/02 709/204 |
| 2010/0231537 A1 * | 9/2010 | Pisula | .................. | G06F 3/0481 345/173 |
| 2010/0274674 A1 * | 10/2010 | Roberts | ............. | G06F 17/30053 705/14.73 |
| 2011/0231474 A1 * | 9/2011 | Locker | .............. | G06F 17/30058 709/203 |

(Continued)

*Primary Examiner* — Phenuel S Salomon
(74) *Attorney, Agent, or Firm* — Knobbe, Martens, Olson & Bear, LLP

(57) ABSTRACT

Systems and methods are provided for determining user interface controls associated with hierarchical levels during media content playback. In some embodiments, instructions may be provided to display user interface controls associated with a level of media content, such as a chapter level. A change in the level of media content and/or the user interface controls associated with the level may be a response to a level change request. A level change request may be initiated by user input and/or may automatically be initiated by the current content playback position.

24 Claims, 8 Drawing Sheets

(56) References Cited

U.S. PATENT DOCUMENTS

| | | | | |
|---|---|---|---|---|
| 2011/0258623 A1* | 10/2011 | Wagner | ............ | H04N 21/41407 |
| | | | | 718/1 |
| 2011/0292438 A1* | 12/2011 | Inami | ................ | H04N 1/00413 |
| | | | | 358/1.15 |
| 2011/0314377 A1* | 12/2011 | Goodman | ............. | G06F 3/0482 |
| | | | | 715/716 |
| 2012/0089951 A1* | 4/2012 | Cassidy | ................ | G06F 3/0481 |
| | | | | 715/854 |
| 2012/0151346 A1* | 6/2012 | McClements, IV | ........................ | |
| | | | | G06Q 10/101 |
| | | | | 715/716 |
| 2012/0197998 A1* | 8/2012 | Kessel | ................... | G06Q 10/10 |
| | | | | 709/205 |
| 2013/0055141 A1* | 2/2013 | Arriola | ............. | G06F 17/30056 |
| | | | | 715/776 |
| 2013/0129310 A1* | 5/2013 | Shustorovich | ......... | H04N 5/775 |
| | | | | 386/230 |
| 2015/0248218 A1* | 9/2015 | Magahern | ............. | G06F 9/4443 |
| | | | | 715/716 |
| 2015/0301693 A1* | 10/2015 | Wheeler | ............ | G06Q 30/0255 |
| | | | | 715/716 |

* cited by examiner

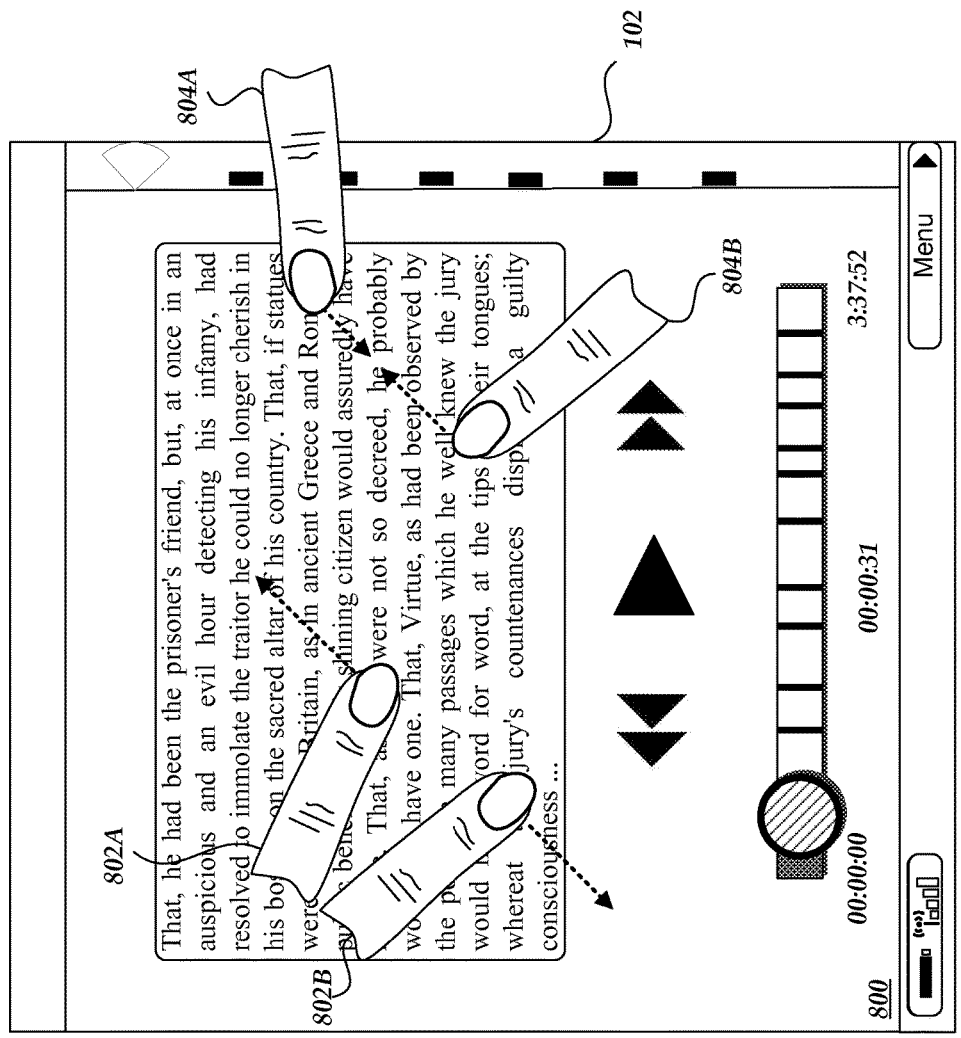

DETERMINING HIERARCHICAL USER INTERFACE CONTROLS DURING CONTENT PLAYBACK

BACKGROUND

Generally described, computing devices may present various types of digital content to users for consumption. For example, computing devices may visually present items of content such as electronic books, movies, television programs and other multimedia content. Similarly, computing devices may aurally present content such as audiobooks, music, movies, and other multimedia content. Some computing devices may enable an individual to navigate through audio content by presenting various controls to an individual such as, pause, play, fast-forward, rewind, or rewind a fixed period of time such as thirty seconds. In many instances, during playback of multimedia content, an individual may accidentally select the wrong control because there are too many controls and the user interface is too cluttered.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 8 is a pictorial diagram of an illustrative user interface presented during playback of media content that includes a set of user interface controls associated with a full book level of the media content instead of a different level of the media content.

DETAILED DESCRIPTION

Figure 1:
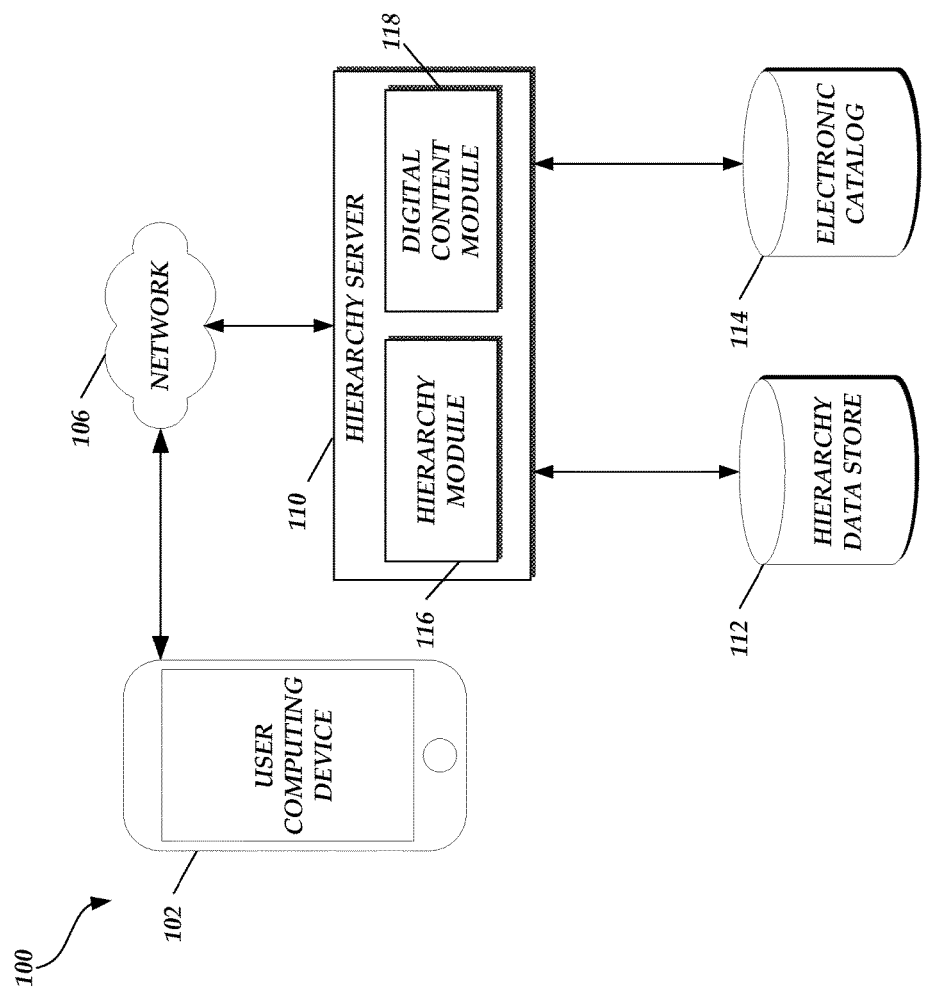
FIG. 1 is a schematic block diagram depicting an illustrative network environment for implementing a hierarchy service that determines user interface controls for presentation during playback of media content based on a hierarchical structure of the media content.

Generally described, aspects of the present disclosure are directed to determining user interface controls for presentation during playback of media content using a hierarchy associated with the media content, and presenting the determined user interface controls in response to a user request. For example, a user may use a personal computing device, such as a smartphone, to listen to an audiobook. During playback of the audiobook the user may be presented various sets of user interface controls on the display of the smartphone to control playback of the audiobook according to a hierarchical level or mode of the audiobook currently being presented. However, in accordance with at least one embodiment, sets of user interface controls associated with two or more levels and/or modes of the audio book are not displayed simultaneously. Rather, each set of user interface controls may be presented in association with a corresponding level and/or mode of audiobook and the set of user interface controls presented may change depending on the level and/or mode of audiobook.

For example, while consuming an audiobook, the user may wish to toggle between chapter level control of the audiobook and full book level control. Accordingly, the user may toggle between a set of user interface controls associated with a chapter level of the audiobook and a set of user interface controls associated with a full book level of the audiobook, where the full book level is considered a node in a hierarchy associated with the audiobook and the chapter level is considered a sub-node of the full book node in the hierarchy. For instance, during playback of an audiobook, while a set of user interface controls associated with the chapter level and/or mode is presented, the user may be momentarily distracted and/or may want to listen to part of the audiobook again. Accordingly, the user may select a rewind thirty seconds user interface control from the set of user interface controls associated with the chapter level of the audiobook in order to repeat output of a prior thirty second portion of the audiobook. However, the user may instead want to skip ahead or behind one or more chapters in the audiobook, rather than just thirty seconds. Accordingly, a set of user interface controls associated with the audiobook at the full book level and/or mode may be presented instead of the set of user interface controls associated with the chapter level. Upon presentation of the set of user interface controls associated with the full book level (instead of the set of user interface controls associated with the chapter level), the user may then select a chapter forward user interface control and/or a chapter behind user interface control. By limiting the presentation of user interface controls to those associated with a particular level of the media content, the user is provided a minimal and/or easy to use interface, which may decrease the number of accidental user inputs.

According to other aspects of the present disclosure, a hierarchy service is described that may determine, during playback of media content, the set of user interface controls to present that is associated with a hierarchical level of the media content. For example, the hierarchy service may determine a level likely to be of interest to the user based on a request for a level change. In some embodiments, the level determined to be of likely interest to the user may be based at least in part on a determined content type, user preferences, and/or user history associated with the media content.

In some embodiments, hierarchical data for given portions of media content (such as audio content of an audiobook) may be determined based at least in part on a corresponding or related item of textual content (such as textual content of an electronic book ("ebook") version of the same underlying book). An item of textual content and a corresponding item of audio content are sometimes referred to herein as "associated" or "companion" content. An item of audio content and a corresponding item of associated textual content may be synchronized with one another for simultaneous presentation. For example, a computing device implementing the hierarchy service may be provided with content synchronization information that maps one or more words in the item of associated textual content with a position of an identical word or words in the item of audio content (e.g., the identical word or words that are spoken, sung, recited, etc. in the item of audio content). In some embodiments, the synchronization information may indicate time positions and/or data locations within associated audio content that correspond to word, paragraph, chapter, section, or other positions within the textual content. For example, chapters of an ebook may be associated with start and/or end times of a chapter in the audiobook. More information regarding synchronizing an item of audio content with an item of associated textual content, as well as content synchronization information that may be stored in association with the synchronization, may be found in U.S. patent application Ser. No. 12/273,473 ("the '473 Application"), filed Nov. 18, 2008, entitled "SYNCHRONIZATION OF DIGITAL CONTENT," which is hereby incorporated by reference in its entirety. An example of associated content, as used herein, may include various representations of content discussed in the '473 Application.

In some embodiments, a hierarchy module (when executed by one or more hardware processors), as disclosed herein, may cause a computing device to display user interface controls associated with a hierarchical level of media content. During playback of the media content by the computing device, the hierarchy module may receive a request for a level change. In some embodiments, the request for a level change may be initiated by user input and/or automatically generated by or during playback of the media content.

In some embodiments, automatically determining and presenting a set of user interface controls associated with a hierarchical level of the media content may simplify the user interface by reducing the number of user interface controls presented to the user. Without such a determination, a user may be presented with at least play, rewind, fast-forward, rewind for thirty seconds, and fast-forward for thirty seconds controls all at the same time. Since a user computing device may have limited screen display size, the display of five or more user interface controls may make the user interface too cluttered. For example, by displaying all of the user interface controls simultaneously, a user may accidentally select the wrong control because the controls may be too close together and/or by having too many controls, the user may be confused. This may frustrate the user because the user may lose their current playback position in the media content. In some embodiments, a user may be enabled to select the level of media content in which he/she is interested. The hierarchy module may then select the appropriate set of user interface controls associated with that level, thereby improving the user interface experience and/or reducing accidental user input.

A hierarchy service, as disclosed herein, may be implemented in any of a number of environments in which media content is presented. In some embodiments, the hierarchy service may be implemented as an application executed on a user computing device configured to present visual and/or audio content. A user interface to navigate the media content may be provided by the user computing device as the application is executed. In other embodiments, the hierarchy service may be implemented via a content page hosted by a hierarchy server on a network. The content page may be accessed by a user computing device via a network resource browser. A user interface for requesting hierarchy data associated with the media content may be provided on the content page, and the media content may be streamed and/or downloaded from the hierarchy server to the user computing device for presentation thereon. Other implementations are possible in different embodiments.

While reference is frequently made herein to audiobooks, books, chapters, multiple books ("multi-book"), etc., it will be appreciated that media content may include any type of content that is presented continuously over time with a hierarchical structure (e.g., where a series of books is associated with a parent node in a hierarchy, each book in the series is associated with a sub-node of said parent node, each chapter of a book in the series associated with a sub-sub-node, etc.). Examples of continuously-presented media content with hierarchical structure may include audiobooks, podcasts, news programs, musical works, television programs, video clips, movies, multimedia content, video games, and any other type of content that may be organized hierarchically. Media content can also include any type of textual content, as an ebook, electronic table of contents, closed caption content, screenplay, script, libretto, transcription (e.g., speech-to-text) or other textual content. As will be appreciated, in some embodiments, textual content representing words spoken in various types of audio content may be determined dynamically using speech recognition and/or other known methods. As will be appreciated, nodes in a hierarchical structure associated with media content may refer to the chapters of a book, a table of contents, indices, episodes of a show, sections of a show defined by advertising and/or commercial breaks, books in a collection, and/or any other type of ordered arrangement of content. Hierarchical data identifying such nodes may be automatically extracted from the media content itself. For example, where an audiobook includes audio content such as, "start of chapter ten," hierarchical and/or chapter data (such as section markers) may be determined dynamically by analyzing the audio content for certain keywords, indicators, phrases, pauses, etc.

Turning to FIG. 1, an illustrative network environment 100 is shown in which a hierarchy service may determine, during playback of media content, a set of user interface controls to present that is associated with a hierarchical level of the media content. The network environment 100 may include a user computing device 102, a network 106, a hierarchy server 110, a hierarchy data store 112, and an electronic catalog 114. The constituents of the network environment 100 may be in communication with each other either locally or over the network 106.

The user computing device 102 may be any computing device capable of communicating over the network 106 and presenting media content to a user, such as a laptop or tablet computer, personal computer, personal digital assistant (PDA), hybrid PDA/mobile phone, mobile phone, smartphone, wearable computing device, global positioning system (GPS) device, electronic book reader, set top box, camera, audiobook player, digital media player, video game console, in-store kiosk, television, appliance, electronic device for inclusion in vehicles or machinery, gaming device, or the like.

The user computing device 102 may generally be capable of presenting audio and/or visual content to a user of the user computing device 102. For example, the user computing device 102 may be capable of playing audio content by directing audible or aural output through speakers, headphones, or the like. In some embodiments, the user computing device 102 may also be capable of presenting images, video content, text, user interfaces, and/or user interface controls on a display screen. The user computing device 102 may further be capable of receiving user input through a user input device, such as a keyboard, mouse, touchpad, touch screen, microphone, trackball, touchscreen, gamepad, or other input device known in the art.

The user computing device 102 may further be capable of accessing network resources, such as content pages, via the network 106. In some embodiments, continuously presented media content may be presented through these content pages by the user computing device 102, e.g., by media content being streamed over the network 106 to the user computing device 102. In other embodiments, media content presented by the user computing device 102 may be retrieved from a data store that is local to the user computing device 102.

In some embodiments, the user computing device 102 stores one or more items of audio content, textual content, associated content, and/or other media content in an electronic data store. For example, the user computing device 102 may include one or more hard disk drives, solid state memories, and/or any other type of non-transitory computer readable storage medium accessible to or integrated within the user computing device 102. These items may be retrieved from storage and conveyed by the user computing device 102 to the user.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. Protocols and components for communicating via the Internet or any of the other aforementioned types of communication networks are well known to those skilled in the art of computer communications and thus, need not be described in more detail herein.

In one embodiment, the hierarchy server 110 includes a computing device that may perform a variety of operations to implement a hierarchy service. For example, the hierarchy server 110 may retrieve media content from the electronic catalog 114, which is described in further detail below, through a digital content module 118. The hierarchy server 110 may determine a set of user interface controls in response to a level change request regarding media content that was retrieved from the electronic catalog 114. In some embodiments, a hierarchy module 116 may access the hierarchy data store 112, which is described in further detail below, to retrieve hierarchy data that may be used to determine a level of the multimedia content likely to be of interest to the user. Additional operations of the hierarchy server 110 are described below with respect to FIG. 2.

The hierarchy data store 112 may electronically store, in some embodiments, preference types, content types, user history and/or behavior, and/or other hierarchical data associated with media content, as further discussed below. The hierarchy data store 112 may be embodied in hard disk drives, solid state memories, any other type of non-transitory computer-readable storage medium, and/or a file, a database, a relational database, stored in any such non-transitory computer-readable media accessible to the hierarchy server 110. The hierarchy data store 112 may also be distributed or partitioned across multiple local and/or storage devices without departing from the spirit and scope of the present disclosure. In some embodiments, the hierarchy data store 112 is a data storage web service.

The hierarchy server 110 may also be in communication with an electronic catalog 114. The electronic catalog 114 may electronically store items of media content, such as audiobooks, podcasts, news programs, musical works, ebooks, television programs, video clips, movies, multimedia content, video games, and/or other types of content. In some embodiments, the electronic catalog 114 may be embodied in various types of non-transitory computer readable storage similar to the hierarchy data store 112. In some embodiments, the hierarchy data store 112 and/or the electronic catalog 114 may store associated or companion content to the multimedia content being presented, such as the ebook corresponding to the present audiobook.

The user computing device 102 and hierarchy server 110 may each be embodied in a plurality of devices. The user computing device 102 and/or hierarchy server 110 may include a network interface, memory, processing unit, and non-transitory computer-readable medium drive, all of which may communicate with each other by way of a communication bus. Moreover, a processing unit may itself be referred to as a computing device. The network interface may provide connectivity over the network 106 and/or other networks or computer systems. The processing unit may communicate to and from memory containing program instructions that the processing unit executes in order to operate the user computing device 102 and hierarchy server 110. The memory generally includes RAM, ROM, and/or other persistent and/or auxiliary non-transitory computer-readable storage media.

It will be recognized that many of the devices described above are optional and that embodiments of the environment 100 may or may not combine devices. Furthermore, devices need not be distinct or discrete. Devices may also be reorganized in the environment 100. For example, the hierarchy server 110 may be represented in a single physical server or, alternatively, may be split into multiple physical servers. In some embodiments, the entire hierarchy service may be represented in a single computing device, such as user computing device 102. Additionally, the environment 100 may not include a network 106.

Additionally, in some embodiments, the hierarchy service is implemented by one more virtual machines implemented in a hosted computing environment. The hosted computing environment may include one or more rapidly provisioned and/or released computing resources. The computing resources may include hardware computing, networking and/or storage devices configures with specifically configured computer-executable instructions. A hosted computing environment may also be referred to as a cloud computing environment.

Figure 2:
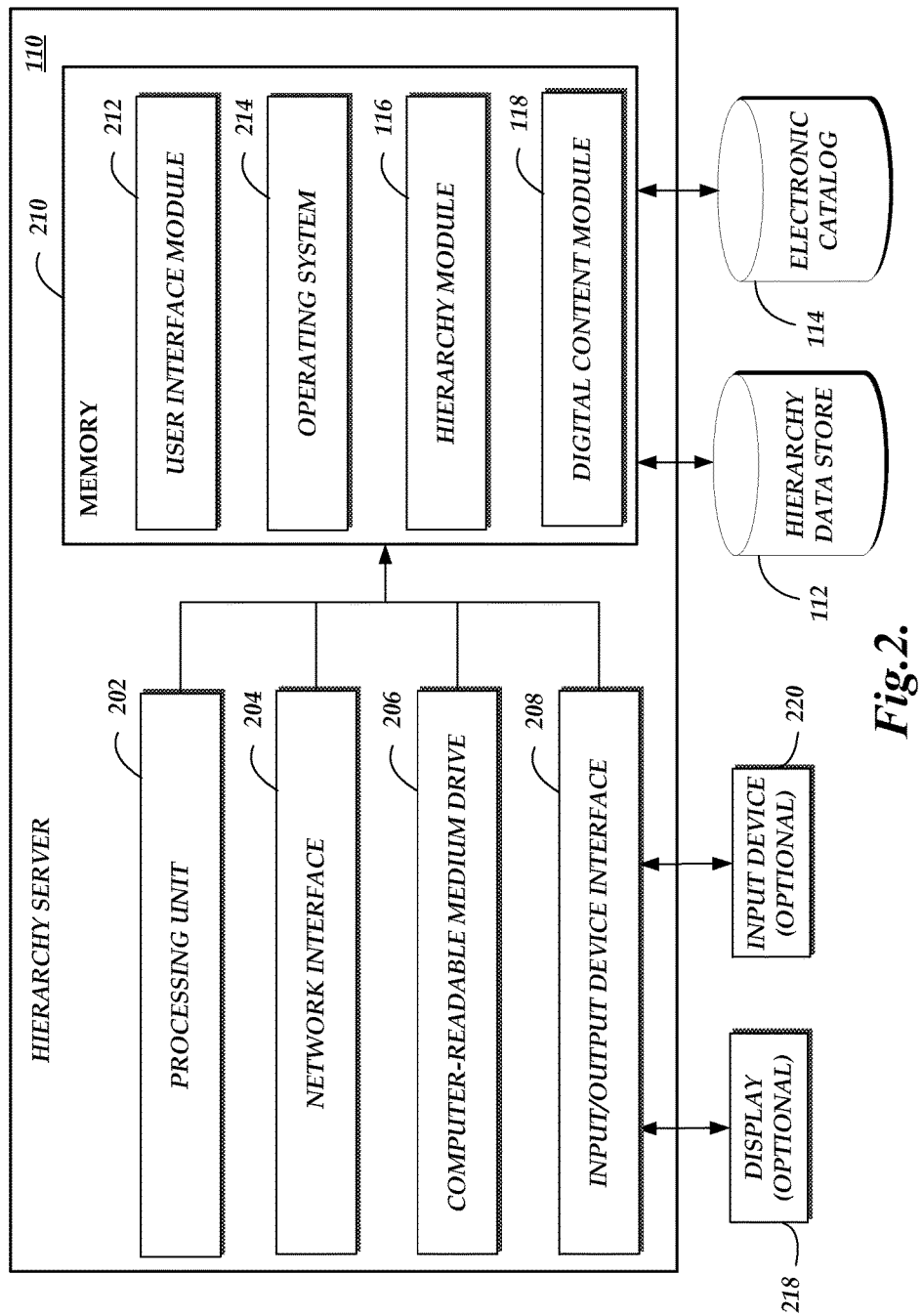
FIG. 2 is a schematic block diagram depicting an illustrative hierarchy server of the network environment depicted in FIG. 1.

FIG. 2 is a schematic diagram of the illustrative hierarchy server 110 shown in FIG. 1. The hierarchy server 110 includes an arrangement of computer hardware and software components that may be used to implement the hierarchy service. FIG. 2 depicts a general architecture of the hierarchy server 110 illustrated in FIG. 1. Those skilled in the art will appreciate that the hierarchy server 110 may include more (or fewer) components than those shown in FIG. 2. It is not necessary, however, that all of these generally conventional components be shown in order to provide an enabling disclosure.

The hierarchy server 110 may include a processing unit 202, a network interface 204, a non-transitory computer-readable medium drive 206, and an input/output device interface 208, all of which may communicate with one another by way of a communication bus. As illustrated, the hierarchy server 110 is associated with, or in communication with, an optional display 218 and an optional input device 220. The display 218 and input device 220 may be used in embodiments in which users interact directly with the hierarchy server 110, such as an integrated in-store kiosk or integrated component for inclusion in an automobile, boat, train, or airplane, for example. In other embodiments, the display 218 and input device 220 may be included in the user computing device 102 shown in FIG. 1. The network interface 204 may provide hierarchy server 110 with connectivity to one or more networks or computing systems. The processing unit 202 may thus receive information and instructions from other computing systems (such as the user computing device 102) or services via network 106. The processing unit 202 may also communicate to and from memory 210 and further provide output information for an optional display 218 via the input/output device interface 208. The input/output device interface 208 may accept input from the optional input device 220, such as a keyboard, mouse, digital pen, touch screen, or gestures recorded via motion capture. The input/output device interface 220 may also output audio data to speakers or headphones (not shown).

The memory 210 may contain specifically configured computer program instructions that the processing unit 202 executes in order to implement one or more embodiments of the hierarchy service. The memory 210 generally includes RAM, ROM and/or other persistent or non-transitory computer-readable storage media. The memory 210 may store an operating system 214 that provides computer program instructions for use by the processing unit 202 in the general administration and operation of the hierarchy server 110. The memory 210 may further include other information for implementing aspects of the hierarchy service. For example, in one embodiment, the memory 210 includes a user interface module 212 that facilitates generation of user interfaces (such as by providing instructions therefor) for display upon a computing device, such as the user computing device 102. For example, a user interface may be displayed via a browser implemented by the user computing device 102. In addition, the memory 210 may include or communicate with the hierarchy data store 112 and/or electronic catalog 114.

In addition to the user interface module 212, the memory 210 may include a hierarchy module 116 that may be executed by the processing unit 202. In some embodiments, the hierarchy module 116 may implement various aspects of the present disclosure. For example, the hierarchy module 116 may receive a level change request related to a portion of media content being presented on the user computing device 102, provide instructions for presentation at the user computing device 102 of a set of user interface controls associated with a level of the media content, and/or other aspects of the disclosure described herein. In some embodiments, the hierarchy module 116 may communicate and/or provide instructions to the user interface module to provide a determined set of user interface controls.

Additionally, the memory 210 may include a digital content module 118 that may be executed by the processing unit 202. In some embodiments, the digital content module 118 may receive a request to retrieve an item of media content. In response to the request, the digital content module 118 may retrieve an item of media content from the electronic catalog 114. The user computing device 102 may locally store or stream the item of media content provided by the digital content module 118.

While the hierarchy module 116 is illustrated as implemented by the hierarchy server 110, in other embodiments, the hierarchy service may be implemented partially or entirely by the user computing device 102. For example, the hierarchy service may be provided as specifically configured hardware and/or specifically configured application software implemented by hardware on the user computing device 102. Accordingly, the user computing device 102 may include a hierarchy module 116 and other components that operate similarly to the components illustrated as part of the hierarchy server 110, including a processing unit 202, network interface 204, non-transitory computer-readable medium drive 206, input/output interface 208, memory 210, user interface module 212, and so forth.

Figure 3:
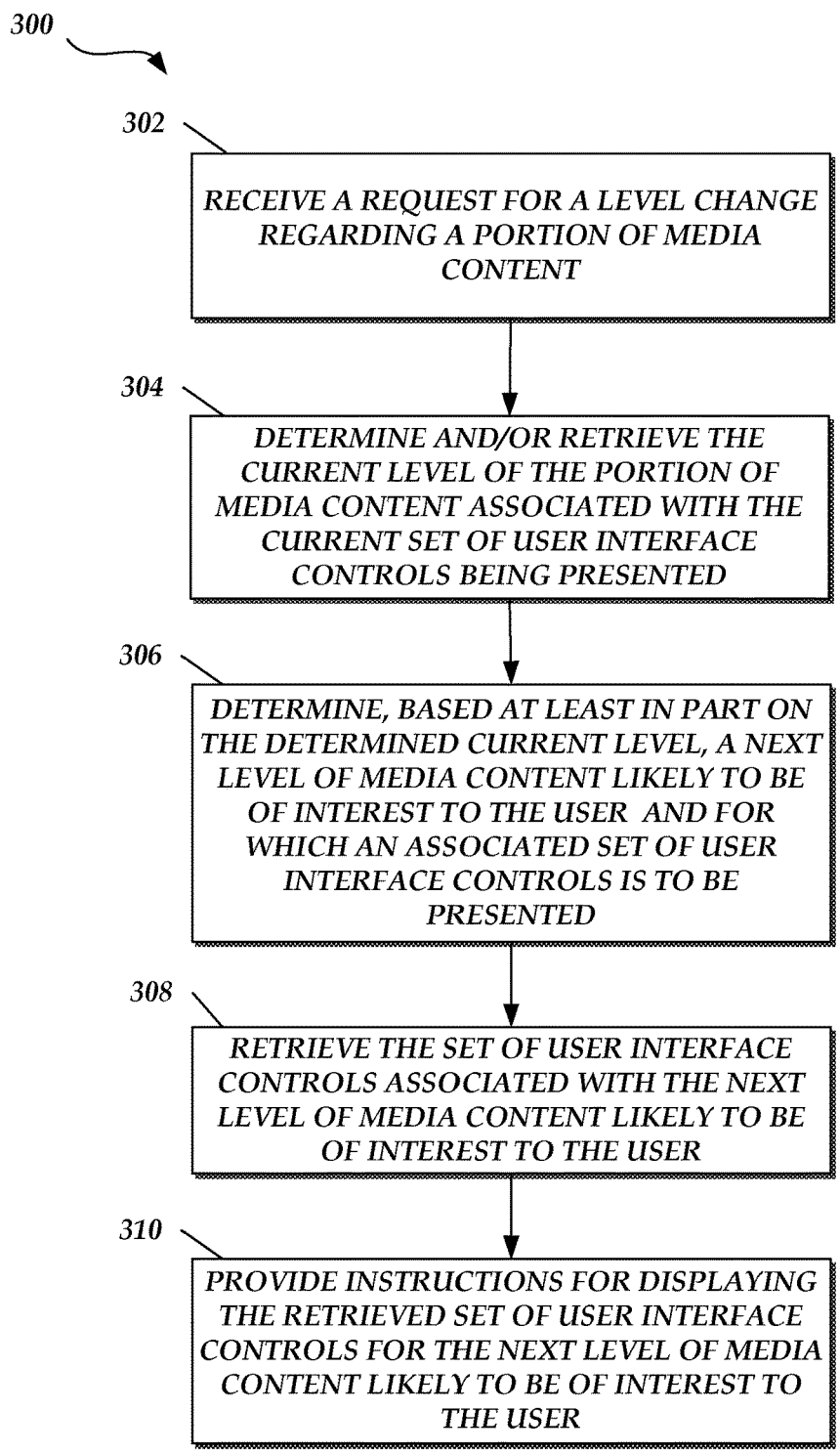
FIG. 3 is a flow diagram depicting an illustrative method for determining, based on the hierarchical structure of media content, which set of user interface controls to present to a user during playback of the media content.

FIG. 3 is a flow diagram depicting an illustrative method 300 implemented by the hierarchy module 116 for determining which set of user interface controls to present to a user during playback of media content, based on a hierarchical structure of the media content. As discussed above, in some embodiments, the hierarchy server 110 may include the hierarchy module 116. In other embodiments, the user computing device 102 may include the hierarchy module 116, and may implement illustrative method 300 without any hierarchy server being needed. In yet other embodiments, functions of the hierarchy module 116 may be distributed between the user computing device 102 and the hierarchy server 110.

Illustrative method 300 begins at block 302, where the hierarchy module 116 receives a request for a level change regarding a portion of media content. For example, the request may be received as a result of user interaction with the user computing device 102 (e.g., tapping a touchscreen of the device) and/or other input mechanisms available to a user during playback of media content, as discussed in more detail with reference to FIGS. 5, 6, 7, and/or 8. The request for a level change may include the current playback position within the media content and/or the current level of the media content for which a set of user interface controls is currently being presented. As one example, the request may include the time of one minute and thirty seconds, which corresponds to the playback position within the media content when the user interacts with the user computing device 102, such as when the user taps a touchscreen of the user computing device, or when such as when the user issues a spoken voice command. In some embodiments, such requests may be received by the user computing device 102 and sent to the hierarchy module 116.

In some embodiments, a level change and/or a request for a level change (that causes the presentation of the user interface controls associated with that level) may be automatically initiated during playback of the media content and/or by other types of triggers or events. For example, the start of a new chapter and/or section of an audiobook may cause a level change such that the set of user interface controls for a chapter level is displayed instead of the set of user interface controls associated with a full book level. As discussed above, the start of the new chapter and/or section in the audiobook may be identified based on chapter and/or section markers found in metadata of an associated ebook or based on start and/or end times of chapters and/or sections found in metadata of the audiobook. In the case of a movie or television program, a level change may be automatically initiated following a commercial break. The initial decision of whether automatic level changes (such as those based on section markers) are permitted may be based the media content type. In some embodiments, only compatible media content types, such as fictional and/or non-fictional media content, may be permitted to automatically level change. Additionally, the type of level change for automatic level changes (such as those based on section markers) may be based on the content type of the media content. For example, fictional content may automatically update to a chapter level of the media content at section markers and/or non-fictional content may automatically update to a full book level of the media content at section markers. Various types of triggers and/or events may cause a level change (such as triggers based on media content types), which is discussed in more detail with reference to FIG. 4.

After a request for a level change is received, the hierarchy module 116, at block 304, determines and/or retrieves the current level of the portion of media content associated with the current set of user interface controls being presented. In some embodiments, the current set of user interface controls being presented during playback of media content is associated with a default level. For example, when a fictional audiobook is played for the first time, a set of user interface controls associated with a default chapter level and/or mode are initially presented on the user computing device 102 for purposes of control or navigation. The hierarchy module 116 may store and/or save the current level of the media content in the hierarchy data store 112. The current level of the media content may be stored even if playback of the media content is paused and/or stopped. Thus, on resuming playback of the media content, the hierarchy module 116 may determine and/or retrieve the current level associated with the media content. In other words, the level associated with a portion of media content may be "sticky." In some embodiments, a default level may be associated or with or set based on the content type, user preferences, and/or user consumption history of media content, which is discussed in more detail below with reference to FIG. 4.

At block 306, the hierarchy module 116 determines, based at least in part on the determined current level, a next level of media content likely to be of interest to the user and for which an associated set of user interface controls is to be presented. For example, the user may have the option of switching between a set of user interface controls associated with a chapter level of the media content and a full book level of the media content. Thus, the determination by the hierarchy module 116 may be a binary determination between dual levels or modes. In other words, if the current level is chapter level, then the next level of media content likely to be of interest to the user and for which an associated set of user interface controls is to be presented, is determined to be a full book level (and vice versa).

In some embodiments, where there are multiple levels of media content (e.g., more than a chapter level and a full book level), the determination by the hierarchy module 116 of a next level of media content likely to be of interest to the user may be based on additional data associated with the request for a level change. For example, the request may include data indicating a change of more than one level. For example, the level change request may include data such as an integer of one, negative one, two, negative two, etc., indicating a directional change of one or more levels. For example, the request to change more than one level may be based on user interactions such as a double tap, pinching, and/or squeezing by the user interacting with a touchscreen of the user computing device 102, as discussed in more detail with reference to FIG. 7 and/or FIG. 8.

At block 308, the hierarchy module 116 retrieves the set of user interface controls associated with the next level of media content likely to be of interest to the user. The set of user interface controls may be stored in the hierarchy data store 112. In other embodiments, the user interface controls are native controls provided by the operating system 214 of the user computing device 102. Accordingly, the hierarchy module 116 may simply retrieve commands for presenting the set of user interface controls from the hierarchy data store 112. In some embodiments, a level of media content and/or the set of user interface controls associated with the level of media content may be further associated with various hierarchical data also stored in the hierarchy data store 112. For example, a chapter level associated with a portion of media content may further be associated with hierarchical data including the time remaining for the chapter, which data may be retrieved from the hierarchy data store 112 and displayed to the user via the user computing device 102, as described with reference to block 310 below. In another example, a full book level associated with the media content may further be associated with hierarchical data including chapter and/or section markers for the media content.

At block 310, the hierarchy module 116 provides instructions for displaying the retrieved set of user interface controls for the next level of media content likely to be of interest to the user. For example, if the next level of media content likely to be of interest to the user is a chapter level, the set of user interface controls associated with the next level may include play, rewind by thirty seconds, and/or fast-forward by thirty seconds controls. Examples of various sets of user interface controls associated with levels of media content are described further below with reference to FIGS. 5, 6, 7, and/or 8. In some embodiments, the mapping or associations of levels to sets of user interface controls may be stored in the hierarchy data store 112.

Figure 4:
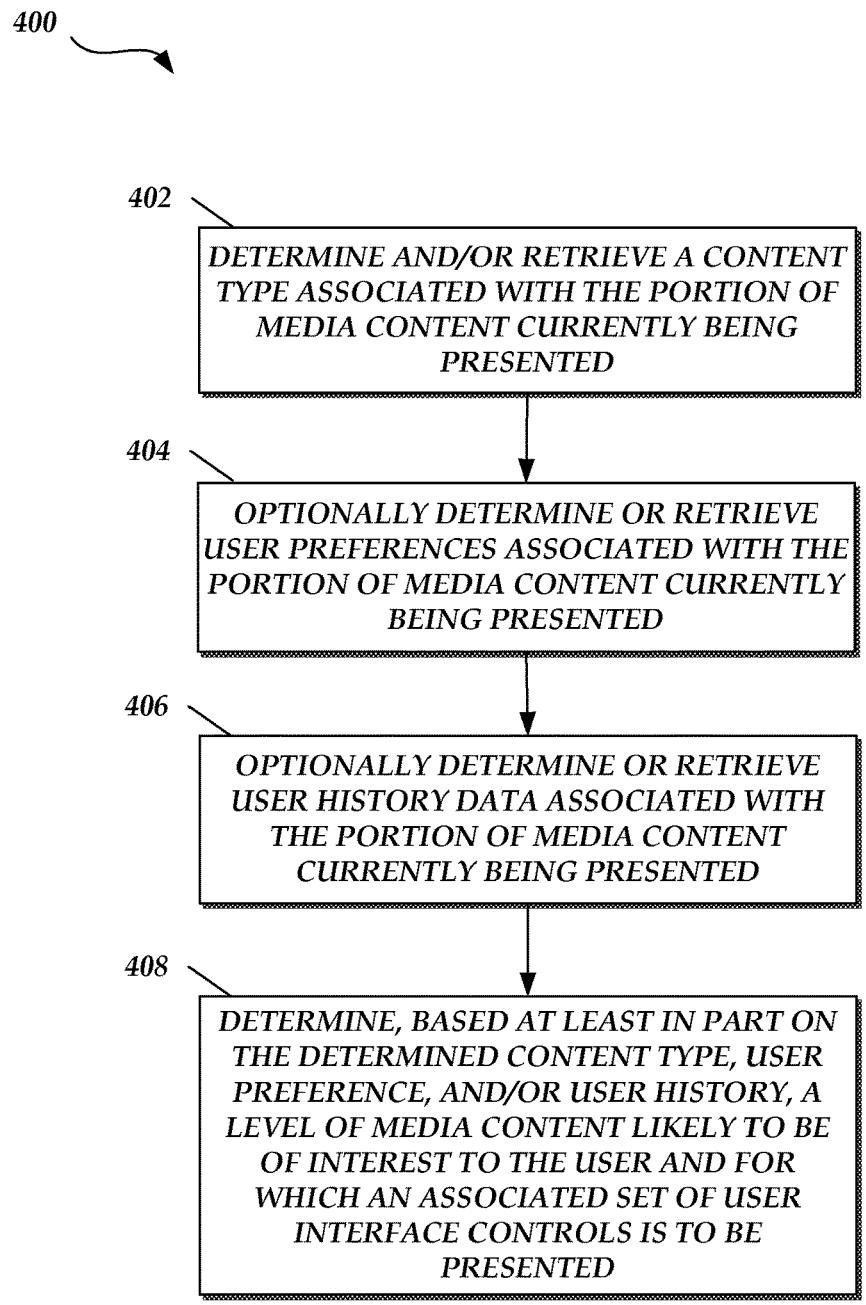
FIG. 4 is a flow diagram depicting another illustrative method for determining, based on the hierarchical structure of media content, which set of user interface controls to present to a user during playback of the media content.

FIG. 4 is a flow diagram depicting an illustrative method 400 implemented by the hierarchy module 116 for determining, based on a hierarchical structure of media content, which set of user interface controls to present to a user during playback of the media content. In some embodiments, similar to illustrative method 300, the user computing device 102 may include the hierarchy module 116, and may implement illustrative method 400 without any hierarchy server being needed. In other embodiments, the user computing device 102 may include the hierarchy module 116, and may implement illustrative method 400 without any hierarchy server being needed. In yet other embodiments, functions of the hierarchy module 116 may be distributed between the user computing device 102 and the hierarchy server 110. Some of the blocks of illustrative method 400 may be implemented by the hierarchy module 116 to determine a next level of media content likely to be of interest to the user and for which an associated set of user interface controls is to be presented. Thus, some of the blocks of illustrative method 400 may be similar to block 306 of FIG. 3 described above.

At block 402 the hierarchy module 116 determines and/or retrieves a content type associated with the portion of media content currently being presented on the user computing device 102. For example, an audiobook may have one or more content types associated with it such as, fiction, non-fiction, series, reference, historical, or any media category and/or type. Media content may also be categorized and/or have types based on the length, qualities, and/or other metadata associated with the media content. A content type may be associated with a default level and/or types of levels of the media content's hierarchical structure that facilitate user interaction. For example, religious, non-fictional, and/or reference media content, such as the Bible, may have a default level and/or mode set to a full book level and/or mode. A full book level and/or mode may be useful for media content such as the Bible because user behavior may indicate that users typically navigate to specific sections or chapters rather than consume the media content from start to finish. Thus, the user may initially be presented with a set of user interface controls associated with a full book level and/or mode, e.g., skip section and/or jump section controls. In contrast, user behavior for fictional media content may indicate a preference to consume media content in a linear manner from beginning to end. Therefore, user interface controls for skipping chapters may be irrelevant and/or less desired, and a chapter level will not be set as a default level for fictional media content.

At block 404, the hierarchy module 116 may optionally determine and/or retrieve user preferences associated with the portion of media content currently being presented on the user computing device 102. For example, a user may have specified that particular level and/or mode of media content be set as the default level or specify the set of user interface control to be associated with a particular level and/or mode of media content. For example, a user may specify preferred controls to be associated or not associated with a particular level of media content, e.g., by specifying that rewind and/or fast-forward by thirty seconds be removed from the set of user interface controls associated with a chapter level and/or mode. Thus, the user interface controls associated with levels of media content may be configurable by a user. The user preferences associated with particular media content and/or settings for all media content may be stored in the hierarchy data store 112.

In some embodiments, the user may be provided with a user interface to customize the controls associated with one or more levels of media content. For example, a user may enter a configure and/or edit mode to select the controls for a particular level. The edit mode may include drag and drop, add, remove, customize, and/or selectable functionality to allow the user to configure the user interface controls associated with one or more levels.

In some embodiments, the user preferences may include customized user interface controls. For example, navigation controls may be configurable. Fast-forward and/or rewind controls may be configured by the user to navigate for different time periods, such as ten seconds, forty-five seconds, one minute, etc. In some embodiments, a user may select from different control configurations and/or configure the properties of various user interface controls.

At block 406, the hierarchy module 116 may optionally determine and/or retrieve user history and/or behavior data associated with the portion of media content currently being presented on the user computing device 102. For example, the hierarchy module 116 may store user history data related to level changes associated with media content at particular playback positions. In some embodiments, the hierarchy module 116 may implement machine learning techniques to determine preferred level changes associated with media content for a particular user. For example, the hierarchy module 116 may recognize that a user switches to chapter level and/or mode for certain or all types of media content and the hierarchy module 116 may then default certain or all types media content to a chapter level and/or mode.

In some embodiments, the hierarchy module 116 may aggregate and/or analyze user history data for the same media content for multiple users. For example, a full book level and/or mode may be selected for particular playback portions of an audiobook by a majority of users. As a result, the hierarchy module 116 may analyze user history data to determine a level of media content likely to be of interest to a user when playback of the audiobook reaches particular playback positions for the same media content.

At block 408, the hierarchy module 116 determines based at least in part on a determined content type, user preference, user history, and/or some combination thereof, a level of media content likely to be of interest to the user and for which an associated set of user interface controls is to be presented. Additional examples of the hierarchy module 116 selecting a level of media content likely to be of interest to a user based on content type includes media content for small group reading and/or activities such as a book club. A small group and/or book club may study visually and/or aurally the same media content (e.g., an audiobook or ebook). In the example, users may only be provided user interface controls associated with the media content to only navigate within a particular chapter and/or section of study, thereby focusing the small group on the particular chapter and/or section of discussion while preventing them from navigating to other parts of the media content. In other words, the users may be locked within the particular chapter and/or section of study by the user interface controls associated with the particular level of media content at that time. As discussed above with reference to blocks 308 and/or 310 of FIG. 3, the hierarchy module 116 may retrieve the set of user interface controls associated with the determined level of media content likely to be of interest to the user and/or provide instructions for displaying the retrieved set of the user interface controls associated with the determined level of media content likely to be of interest to the user.

In some embodiments, the hierarchy module 116 may additionally use user preferences and/or user history data to determine a level of media content likely to be of interest to the user. In the previously mentioned example, history data regarding selected levels for time positions of media content by other users may be used to automatically select level changes when media content reaches those specified playback positions. However, the user preferences for a particular user regarding levels of media content may be used to override a suggested level based on the history data of other users.

FIGS. 5, 6, 7, and 8 illustrate example user interfaces with various user interface controls, according to some embodiments of the present disclosure. Alternate implementations are included within the scope of the embodiments described herein that provide for different variations of user interface controls from the user interface controls that are shown or discussed.

Figure 5:
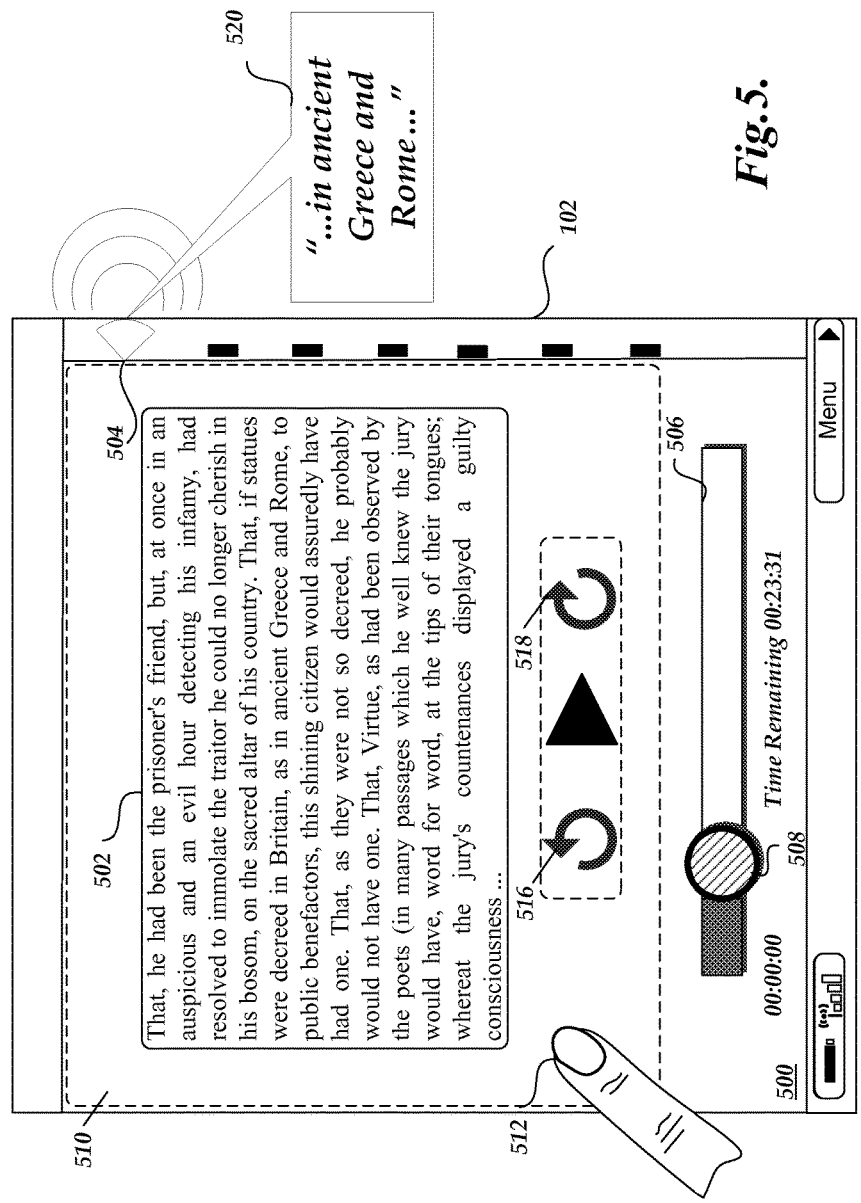
FIG. 5 is a pictorial diagram of an illustrative user interface presented during playback of media content that includes a set of user interface controls associated with a chapter level of the media content.

FIG. 5 is a pictorial diagram that includes an illustrative user interface 500 presented during playback of media content that includes a set of user interface controls associated with a chapter and/or section level of the media content presented during media content playback. As illustrated, the user interface 500 may be displayed on user computing device 102. The user interface may be generated at least in part by the user computing device 102 and/or the hierarchy server 110, depending on the embodiment. As illustrated, user computing device 102 may aurally present audio 520 corresponding to words via one or more speakers 504 and/or one or more audio outputs, which may be provided to speakers or headphones. Example user interface 500 additionally includes a displayed portion of the text content 502, which represents text of the spoken words of the audio data (such as an audiobook) starting at the current playback position. Text content 502 is shown for illustrative purposes only and may not be displayed in other embodiments. The audio 520 presented in the illustrated example includes narrated audio content, which are the spoken words or phrases "in ancient Greece and Rome."

Figure 6:
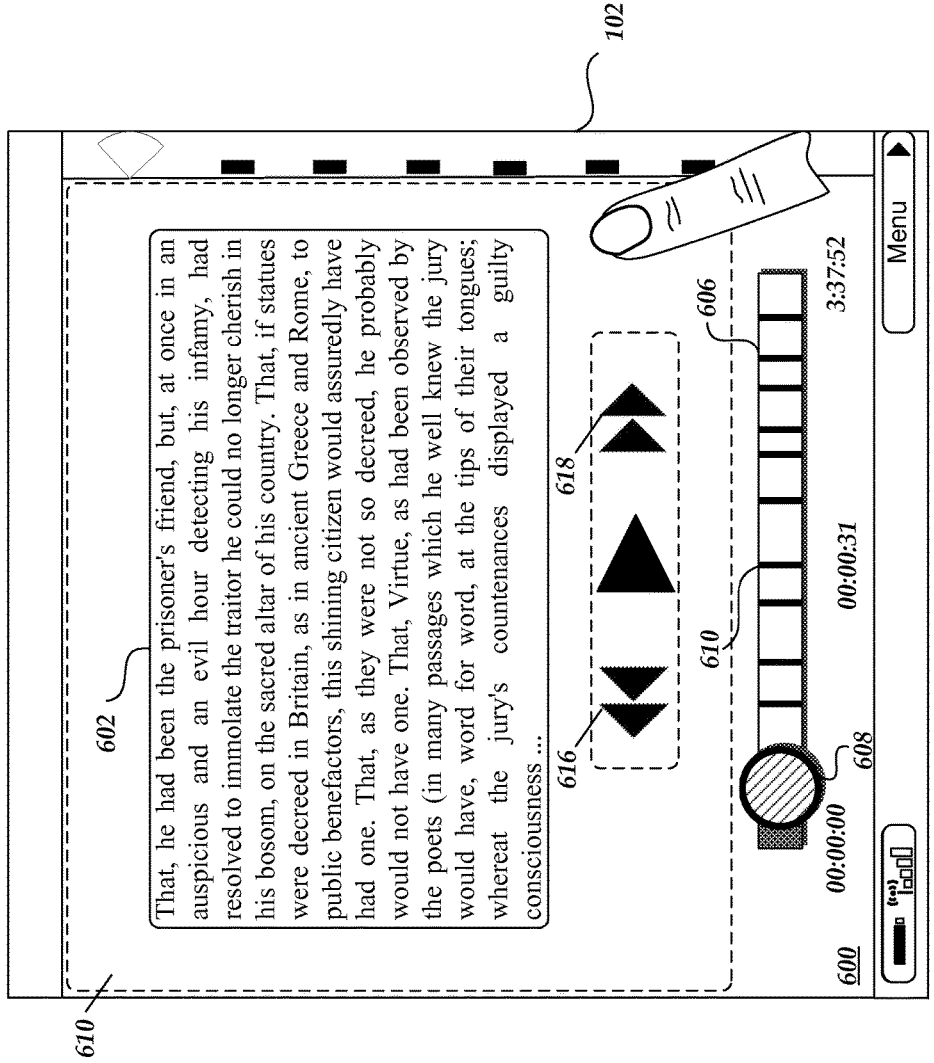
FIG. 6 is a pictorial diagram of an illustrative user interface presented during playback of media content that includes a set of user interface controls associated with a full book level of the media content instead of the user interface controls associated with the chapter level of the media content.
Figure 7:
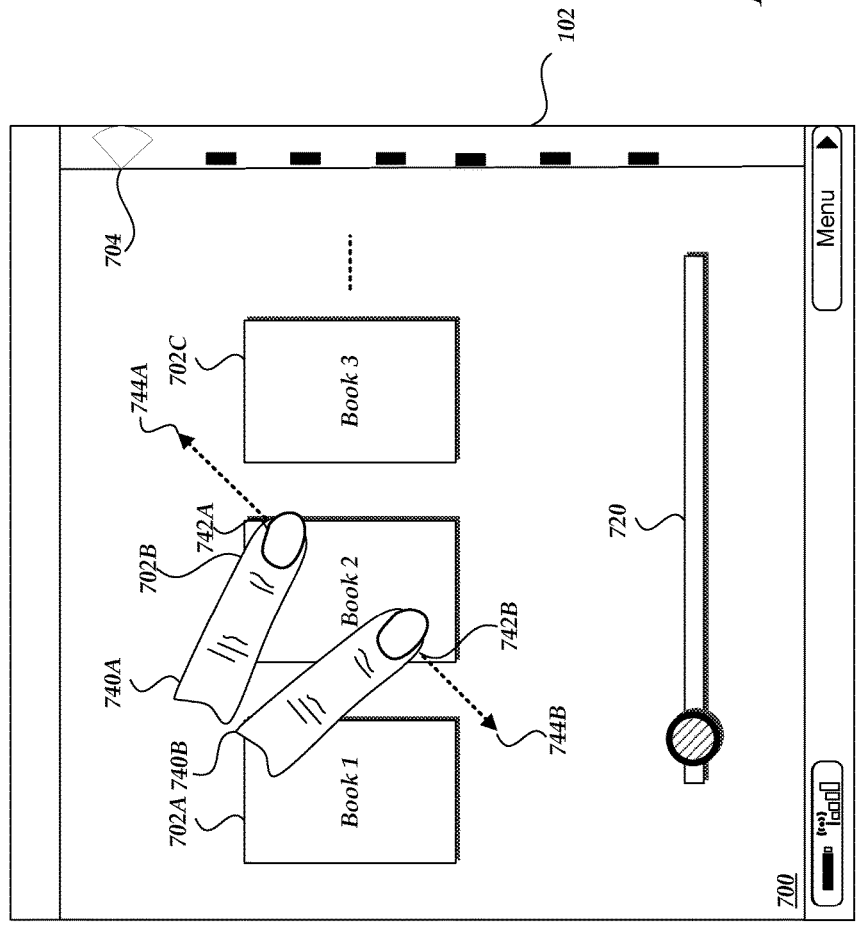
FIG. 7 is a pictorial diagram of an illustrative user interface presented during playback and/or navigation of media content that includes a set of user interface controls associated with a multi-book level of the media content instead of the user interface controls associated with a different level of the media content.

Example user interface 500 includes a selectable user interface control area 510 that may be selected by a user to request a change in the user interface controls associated with a level of the media content. For example, a user may tap, select, and/or touch within the selectable user interface control area, as illustrated by the user finger 512. The hierarchy module 116 may receive the request initiated from the user interaction with the selectable user interface area 510 and/or some other user interaction or input. The request may be received, for example, based on the illustrative method 300, discussed above. Furthermore, the user interaction with the selectable user interface area 510 and/or some other user interaction or input may initiate a user interface level change of the media content as illustrated by FIGS. 6, 7, and/or 8, discussed in more detail below.

In some embodiments, the illustrative user interface 500 may be associated with a chapter level and/or mode of the media content. For example, the text content 502 and/or audio content 520 may be associated with a particular chapter and/or section of the media content and/or audiobook. The user interface controls 516 may be associated with the chapter level of the media content. For example, the controls of user interface 500 may include a fixed rewind control 516 and/or fixed fast-forward control 518 such as fast-forward thirty seconds and/or rewind thirty seconds, respectively. While the user is viewing the chapter level and/or mode of the media content, a user maybe interested in the text content and/or audio content proximate to the current playback position of the media content as opposed to controls that allow the user to skip chapters and/or sections. Providing minimal user interface controls as illustrated by FIG. 5 may be beneficial to the user experience by reducing the visible controls to the user and reducing clutter in the user interface 500. The user may be presented with a simple and easy to use interface.

In some embodiments, there may be variations of the user interface controls of user interface 500. For example, as discussed above, the fixed rewind control 516 and/or fixed fast-forward control 518 may be for different time periods. Additionally, the user interface controls of user interface 500 may be configured by the user. For example, the user may specify different time periods for the fixed rewind and/or fast-forward controls. In other examples, the user may configure different controls to be associated with user interface 500.

The user interface 500 may include a progress bar control 506 that represents the current playback position of the media content by the location of a position indicator 508. In some embodiments, the position indicator 508 may be configured to be manipulated with respect to the progress bar control 506, such as by dragging and/or sliding it across the progress bar control 506. The progress bar control 506 may be configured to be associated with the current level of the media content. For example, the progress bar control 506 may represent the current playback position of the media content within a particular chapter of the media content and/or may represent the time remaining within the particular chapter of the media content. In other words, the user may be "locked" to navigate within the chapter and/or section of media content while in a chapter level and/or mode of the media content. Thus, various aspects of the progress bar control 506 may be associated with the current level of media content, such as a chapter level and/or mode of the media content as depicted by FIG. 5.

FIG. 6 is a pictorial diagram that includes an illustrative user interface 600 presented during playback of media content that includes a set of user interface controls associated with a full book and/or macro level of the media content instead of the user interface controls associated with the chapter and/or section level of the media content. As illustrated, user interface 600 includes many elements similar to user interface 500 discussed above. Example user interface 600 may include controls and/or a selectable user interface control area 610. The controls of user interface 600 may be associated with the current level and/or mode of the media content. For example, controls of user interface 600 may include a chapter backward control 616 and/or chapter forward control 618 because user interface 600 is associated with a full book level of the media content. As discussed above, while a user is in a full book level and/or mode of the media content, the user may be primarily interested in navigating entire chapters and/or sections of the book, and, therefore, user interface 600 may present minimal user interface controls corresponding to those interests.

In some embodiments, the display of user interface 600 may result from the user interaction illustrated in FIG. 5, described in detail above. For example, user interaction with the selectable user interface control area 510 may result in the display of user interface 600 and/or the display of the controls of user interface 600 (instead of the user interface 500 and/or the controls of user interface 500). Similarly, user interaction with the selectable user interface control area 610 may result in the display of user interface 500 (or vice versa). In some embodiments, a user may toggle, switch, and/or navigate between user interfaces 500 and 600 by selecting the selectable user interface control areas 610 and 510, respectively, and/or some other user interaction or input.

The user interface 600 may include a progress bar control 606 similar to the progress bar control 506 of FIG. 5. The progress bar control 606 may be configured to be associated with the current level of the media content. For example, the progress bar control 606 may represent the current playback position of the media content within the full book because user interface 600 may be in full book level and/or mode of the media content. In some embodiments, a position indicator 608 may be configured to be manipulated with respect to the progress bar control 606, such as by dragging and/or sliding it across the progress bar control 606, and/or the position indicator 608 may lock to the next chapter breakpoint and/or marker 610. Configuring a position indicator 608 to snap and/or lock to the next chapter breakpoint 610 may allow the user to easily skip and/or navigate to chapters within the media content while in a full book level and/or mode. In some embodiments, the user may be presented with a tooltip and/or textual content indicating the chapter number as the position indicator 608 is moved across the progress bar control 606, which may allow the user to see and/or preview the chapter that they may move to. Additionally, the progress bar control 606 may represent the current playback time within the entire book. For example, the progress bar control 606 may display the current time of "00:00:31" within the entire playback time of "3:37:52" of the media content. Thus, various aspects of the progress bar control 606 may be associated with the current level of the media content, such as a full book level and/or mode of the media content as depicted by FIG. 6.

In some embodiments, selection of the position indicator 608 of the progress bar control 606, to a chapter breakpoint, in full book mode of the media content, may initiate a level change request to a chapter level of the media content. For example, if a user has skipped to a new chapter it is likely that the user would prefer user interface controls associated with navigating within a chapter of the media content. In some embodiments, a relative large and/or long time period change of the progress bar control, such as skipping twenty minutes within the media content, may initiate a level change request, such as a change to a chapter level and/or mode of the media content.

In some embodiments, there may be variations of the text content 602. For example, text content 602 in a full book level and/or mode of the media content may display the table of contents, list of chapters and/or sections, and/or any macro view of the media content. Thus, as the user switches to the user interface 600, which may correspond to a full book level and/or mode of the media content, the text content 602 may display selectable textual content that enables a user to jump to those respective chapters and/or sections of the media content (instead of the text content 502 corresponding to words of the media content).

In some embodiments, it will be appreciated that disclosed herein are systems and methods that enable the display of various types of user interface controls through different input means. For example, in a full book mode of the media content, the user may be presented user interface controls for marking and/or bookmarking particular chapters. In another example, in chapter mode of the media content, the user may be presented user interface controls to highlight, annotate, and/or bookmark textual content, such as the displayed portion of the text content 502 of FIG. 5. In some embodiments, in certain levels and/or modes of the media content, a user may be presented with two or more progress bar controls, such as the progress bar control 506 of FIG. 5 and the progress bar control 606 of FIG. 6.

In some embodiments, there may be user interface controls to navigate an entire series and/or collection of media content in a non-linear manner based on subject matter and/or other related data. For example, in a fictional book and/or series of several volumes where each chapter is dedicated to a character, a user may be presented user interface controls to select a particular character and/or navigate to sections and/or chapters associated only with that particular character. For example, if the "John" character is the subject of chapters one, three, and seven, then a user may select a level of the media content associated with the character "John" (here the book is associated with a node and each set of chapters associated with a character and/or subject is associated with a sub-node). While the level of media content for the "John" character is selected, the hierarchy module 116 may provide instructions for presenting user interface controls to exclusively navigate chapters one, three, and seven of the media content. User interface controls to select the subject and/or character of a series and/or collection of media content is discussed in further detail below with reference to FIG. 7.

FIG. 7 is a pictorial diagram that includes an illustrative user interface 700 presented during playback and/or navigation of media content that includes a set of user interface controls associated with a multi-book level of media content instead of the user interface controls associated with a different level of the media content. For example, user interface 700 may be displayed and/or presented before or during media content playback. User interface 700 may include representative media content 702 (including representative media content 702A, 702B, and 702C). Representative media content 702 may represent an item and/or book in a collection of media content. The user interface 700 may be associated with a multi-book level of media content to present one or more books in a series and/or collection. For example, representative media content 702A, 702B, and 702C may represent the first, second, and third volumes and/or books in a series and/or collection. A user may navigate and/or select media content by selecting one of the representative media content 702. The ellipsis 718 may illustrate that one or more items of representative media content 702 may be presented, such as ten books in a series and/or collection.

In some embodiments, a user may navigate to an item of media content and/or a level of media content through various user interactions and/or inputs. For example, a user may place fingers 740A and 740B on the screen of user computing device 102 or any other input mechanism at starting points 742A and 742B, respectively. The user may then move and/or drag fingers 740A and 740B or any other input mechanism to ending points 744A and 744B, respectively. As a result of the illustrated "zooming in" motion and/or some other user interaction or input, the user may cause an update of the user interface 700 and/or present a different user interface to navigate into an item of media content and/or cause a level change of the media content. For example, the user interaction may result in the presentation of the one or more user interfaces, such as the user interface illustrated by FIG. 8, discussed in more detail below, and/or of the user interfaces of FIG. 5 or FIG. 6, discussed above.

In some embodiments, user interface 700 may include various user interface controls associated with a multi-book and/or high level of media content. The user interface controls associated with user interface 700 may be presented instead of the user interface controls associated with a different level of the media content, such as a chapter and/or full book level of the media content. For example, a slider control 720 may allow a user to navigate through items of representative media content 720. User interface 700 may provide various views and/or user interface controls associated with a multi-book and/or high level view of a series and/or collection of media content. As discussed above, there may be user interface controls to navigate through media content in a non-linear manner based on a common character, subject, and/or other related data. The user interface 700 may provide controls to select a common subject and/or character in an item and/or series of media content for continuous media content playback relating to that particular subject and/or character.

FIG. 8 is a pictorial diagram that includes an illustrative user interface 800 presented during playback of media content that includes a set of user interface controls associated with a full book level presented during content playback instead of a different level of the media content. As illustrated, user interface 800 includes many elements similar to user interface 600 discussed above.

In some embodiments, the display of user interface 800 may result from the user interaction illustrated in FIG. 7, described in detail above. For example, user interaction with fingers 740 of FIG. 7 may result in the display of user interface 800. The user interaction to change levels from user interface 700, which may be associated with a multi-book level, may drop down a level to a full book level and/or mode as illustrated by user interface 700. Furthermore, the presentation of user interface 800 includes a set of user interface controls associated with the full book level of the media content instead of a different level of the media content, such as the multi-book level and/or chapter level of the media content. Similar to the user interaction illustrated by user interface 700 to change levels of the media content, user interactions with fingers 802 to further "zoom in" and/or fingers 804 to "zoom out" may result in further level changes. For example, the pinching interaction as illustrated by fingers 804 may cause an update of the display to the user interface 700 as illustrated by FIG. 7 and/or further "zooming in" illustrated by fingers 802 may result in the display of user interface 500 as illustrated by FIG. 5.

In some embodiments, it will be appreciated that disclosed herein are systems and methods that enable the determination and/or navigation of level changes of media content through various user interactions. For example, a click, tap, swipe, slide, double tap, tap and hold, pinching, scrunching, expanding, zooming, other user interactions or input, and/or some combination thereof may be used to navigate various levels of media content. For example, a tap may change one level and/or a double tap me change two levels of media content. In some embodiments, pinching and/or expanding may change one or more levels of media content based on the relative degree of the motion and/or interaction. For example, a relative large zoom motion may change more than one level and/or a relative small zoom motion may change only one level.

In some embodiments, there may be various visualizations and/or animations associated with level changes of media content. For example, the user interface level changes as illustrated by FIGS. 5, 6, 7, and/or 8 may be represented by zooming out visual animations, zooming in visual animations, paging, and/or various visualizations to indicate a level change of media content.

In some embodiments, it will be appreciated that disclosed herein are systems and methods that allow the determination levels of media content that includes sets of user interface controls associated with levels of media content exclusively through audio input and/or output mechanisms. For example, a user may listen to audio content during playback. During playback of the audio content, the user may speak "chapter mode" and/or "full book mode." The selection of a level and/or mode of the media content may restrict the acceptable spoken controls and/or commands for that level and/or mode of the media content. For example, in chapter level and/or mode of the media content, "chapter forward," may be an invalid command because the user may be limited to navigating within the chapter of the media content. The limitation of available commands through level and/or mode selection may increase the accuracy and/or speed of voice recognition by the hierarchy module 116 because there may be a limited number of valid commands that must be determined based on the selected level and/or mode.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conjunctive language such as the phrase "at least one of X, Y and Z," unless specifically stated otherwise, is otherwise understood with the context as used in general to convey that an item, term, etc. may be either X, Y, or Z, or a combination thereof. Thus, such conjunctive language is not generally intended to imply that certain embodiments require at least one of X, at least one of Y, and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted or executed out of order from that shown or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   an electronic data store configured to at least store an audiobook; and
   a computing system comprising one or more hardware computing devices executing specific computer-executable instructions, said computing system in communication with the electronic data store, and configured to at least:
   cause playback of the audiobook;
   determine a first content type associated with the audiobook;
   select a first hierarchical level of the audiobook from a plurality of hierarchical levels, wherein the first hierarchical level is selected based at least in part on having an association with the first content type;
   present a first set of user interface controls associated with the first hierarchical level of the audiobook, wherein the first set of user interface controls is configured to control playback to a first location within the audiobook;
   detect that a current playback position of the audiobook corresponds to a section marker associated with the audiobook; and
   in response to detecting that the current playback position of the audiobook corresponds to the section marker, present a second set of user interface controls instead of the first set of user interface controls, wherein the second set of user interface controls is configured to control playback to a second location within the audiobook, and wherein to present the second set of user interface controls, the computing system is further configured to at least:
   determine that a current level of the audiobook corresponds to the first hierarchical level;
   select a second hierarchical level of the audiobook from the plurality of hierarchical levels, wherein the second hierarchical level is selected based at least in part on the current level; and
   determine the second set of user interface controls associated with the second hierarchical level of the audiobook, wherein the second set of user interface controls is different from the first set of user interface controls.

2. The system of claim 1, wherein the first hierarchical level comprises one of a chapter level or a full book level.

3. The system of claim 1, wherein the second set of user interface controls comprise a user interface control associated with a current position marker and at least one chapter marker.

4. The system of claim 1, wherein the first content type comprises a fictional content type and the first hierarchical level comprises a chapter level.

5. The system of claim 1, wherein the first set of user interface controls comprises a fixed fast-forward control and a fixed rewind control, and wherein the second set of user interface controls comprises a chapter forward control and a chapter back control.

6. A system comprising:
   an electronic data store configured to at least store media content; and
   a computing system comprising one or more hardware computing devices executing specific computer-executable instructions, said computing system in communication with the electronic data store, and configured to at least:
   cause playback of the media content on a user device;
   determine a first content type associated with the media content;
   select a first hierarchical level of the media content from a plurality of hierarchical levels, wherein the first hierarchical level is selected based at least in part on having an association with the first content type;
   detect that a current playback position of the media content corresponds to a section marker associated with the media content; and
   in response to detecting that the current playback position of the media content corresponds to the section marker, cause the user device to present a second set of user interface controls instead of the first set of user interface controls, wherein the second set of user interface controls is configured to control playback to a second location within the media content, and wherein to cause the user device to present the second set of user interface controls, the computing system is further configured to at least:
   determine that a current level of the media content corresponds to the first hierarchical level associated with a first set of user interface controls presented on the user device, wherein the first set of user interface controls is configured to control playback to a first location within the media content;
   select a second hierarchical level of the media content from the plurality of hierarchical levels, wherein the second hierarchical level is selected based at least in part on the current level; and
   determine the second set of user interface controls associated with the second hierarchical level of the media content, wherein the second set of user interface controls is different from the first set of user interface controls.

7. The system of claim 6, wherein the first content type comprises a fictional content type and the first hierarchical level comprises a chapter level.

8. The system of claim 7, wherein first set of user interface controls comprises a fixed fast-forward control and a fixed rewind control.

9. The system of claim 6, wherein the computing system is further configured to at least determine that the first content type corresponds to a compatible content type.

10. The system of claim 6, wherein the section marker is from metadata associated with the media.

11. The system of claim 6, wherein the media content comprises an audiobook, and wherein the section marker comprises a chapter begin point, and the second hierarchical level comprises a chapter level of the audiobook.

12. The system of claim 6, wherein the computing system is further configured to at least:
   receive a user initiated request to change the second set of user interface controls;
   determine a third set of user interface controls based at least in part on the second hierarchical level; and
   cause the user device to present the third set of user interface controls.

13. The system of claim 12, wherein the user initiated request is initiated by a user interaction with a display that presents the second set of user interface controls.

14. A computer-implemented method comprising:
causing playback of media content on a computing device;
determining a first content type associated with the media content;
selecting a first hierarchical level of the media content from a plurality of hierarchical levels, wherein the first hierarchical level is selected based at least in part on having an association with the first content type;
causing the computing device to present a first set of user interface controls associated with the first hierarchical level of the media content, wherein the first set of user interface controls is configured to control playback to a first location within the media content;
detecting that a current playback position of the media content corresponds to a section marker associated with the media content; and
in response to detecting that the current playback position of the media content corresponds to the section marker, causing the computing device to present a second set of user interface controls instead of the first set of user interface controls, wherein the second set of user interface controls is configured to control playback to a second location within the media content, wherein causing the computing device to present the second set of user interface controls further comprises:
determining that a current level of the media content corresponds to the first hierarchical level;
selecting a second hierarchical level of the media content from the plurality of hierarchical levels, wherein the second hierarchical level is selected based at least in part on the current level; and
determining the second set of user interface controls associated with the second hierarchical level of the media content, wherein the second set of user interface controls is different from the first set of user interface controls.

15. The computer-implemented method of claim 14, wherein the first hierarchical level comprises one of a section level or a macro level.

16. The computer-implemented method of claim 14, wherein the second set of user interface controls comprises a control representing a current position marker and at least one section breakpoint.

17. The computer-implemented method of claim 14, wherein the first set of user interface controls comprises a fixed fast-forward control and a fixed rewind control, and wherein the second set of user interface controls comprises a section forward control and a section back control.

18. The computer-implemented method of claim 14, wherein the media content comprises at least one of audio content or video content.

19. The computer-implemented method of claim 14 further comprising:
receiving a user initiated request to change the second set of user interface controls;
determining a third set of user interface controls based at least in part on the second hierarchical level; and
causing the computing device to present the third set of user interface controls.

20. The computer-implemented method of claim 19, wherein the third set of user interface controls comprises a fixed fast-forward control and a fixed rewind control.

21. A computer-readable, non-transitory storage medium storing computer executable instructions that, when executed by one or more computing devices, configure the one or more computing devices to perform operations comprising:
causing playback of media content on the one or more computing devices;
determining a first content type associated with the media content;
selecting a first hierarchical level of the media content from a plurality of hierarchical levels, wherein the first hierarchical level is selected based at least in part on having an association with the first content type;
determining a first set of user interface controls associated with the first hierarchical level of the media content, wherein the first set of user interface controls is configured to control playback to a first location within the media content;
causing the one or more computing devices to present the first set of user interface controls;
detecting that a current playback position of the media content corresponds to a section marker associated with the media content; and
in response to detecting that the current playback position of the media content corresponds to the section marker, causing the one or more computing devices to present a second set of user interface controls instead of the first set of user interface controls, wherein the second set of user interface controls is configured to control playback to a second location within the media content, and wherein causing the one or more computing devices to present the second set of user interface controls further comprises:
selecting a second hierarchical level of the media content from the plurality of hierarchical levels, wherein the second hierarchical level is selected based at least in part on the first hierarchical level; and
determining the second set of user interface controls associated with the second hierarchical level of the media content, wherein the second set of user interface controls is different from the first set of user interface controls.

22. The computer-readable, non-transitory storage medium of claim 21, wherein the first hierarchical level comprises one of a section level or a macro level.

23. The computer-readable, non-transitory storage medium of claim 21, wherein the second set of user interface controls comprises a control representing a current position marker and at least one section breakpoint.

24. The computer-readable, non-transitory storage medium of claim 21, wherein the first set of user interface controls comprises a fixed fast-forward control and a fixed rewind control, and wherein the second set of user interface controls comprises a section forward control and a section back control.

* * * * *